United States Patent
Wang et al.

(10) Patent No.: US 11,126,022 B2
(45) Date of Patent: Sep. 21, 2021

(54) DISPLAY DEVICE AND DISPLAY METHOD THEREOF

(71) Applicant: BOE TECHNOLOGY GROUP CO., LTD., Beijing (CN)

(72) Inventors: Wei Wang, Beijing (CN); Yafeng Yang, Beijing (CN); Xiaochuan Chen, Beijing (CN); Wenqing Zhao, Beijing (CN); Zhongxiao Li, Beijing (CN); Jifeng Tan, Beijing (CN); Xianqin Meng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/996,222

(22) Filed: Aug. 18, 2020

(65) Prior Publication Data
US 2020/0379285 A1    Dec. 3, 2020

Related U.S. Application Data

(62) Division of application No. 15/742,721, filed as application No. PCT/CN2017/093879 on Jul. 21, 2017, now abandoned.

(30) Foreign Application Priority Data

Oct. 21, 2016    (CN) .......................... 201610921400.5

(51) Int. Cl.
*G02F 1/1335*    (2006.01)
*G02F 1/1343*    (2006.01)
(Continued)

(52) U.S. Cl.
CPC ...... *G02F 1/1326* (2013.01); *G02F 1/133504* (2013.01); *G02F 1/133524* (2013.01);
(Continued)

(58) Field of Classification Search
CPC ....................... G02B 27/0172; G02B 27/4272; G02B 27/44; G02B 27/0944; G02B 6/0016;
(Continued)

(56) References Cited

U.S. PATENT DOCUMENTS

| | | |
|---|---|---|
| 5,193,130 A | 3/1993 | Nishiwaki et al. |
| 2012/0092590 A1 | 4/2012 | Shestak et al. |

(Continued)

FOREIGN PATENT DOCUMENTS

| | | |
|---|---|---|
| CN | 101419340 A | 4/2009 |
| CN | 105572984 A | 5/2016 |

(Continued)

OTHER PUBLICATIONS

International Search Report and Written Opinion dated Dec. 27, 2017 from State Intellectual Property Office of the P.R. China dated Jul. 16, 2019.
(Continued)

*Primary Examiner* — Thoi V Duong
(74) *Attorney, Agent, or Firm* — Dilworth & Barrese, LLP.; Michael J. Musella, Esq.

(57) ABSTRACT

A display device and a display method thereof are provided. The display device includes: a first base substrate (10) and a second base substrate (20) which are arranged oppositely and a liquid crystal layer (30) between the first base substrate (10) and the second base substrate (20), the display device further includes: a waveguide grating (40) between the liquid crystal layer (30) and the first base substrate (10), the waveguide grating (40) including a waveguide layer (401) and a grating layer (402) on one side of the waveguide layer (401) facing the liquid crystal layer (30), and the grating layer (402) being in contact with the liquid crystal layer (30); and a collimation light source (50) on a lateral surface of the waveguide layer (401), light emitted by the collimation light
(Continued)

source (50) being coupled into the waveguide layer (401) and output from the grating layer (402). The display device can regulate an amount of the light output from the waveguide grating by controlling changes of the refractive index of the liquid crystal layer so as to implement gray scale display.

15 Claims, 5 Drawing Sheets

(51) Int. Cl.
    *G02F 1/13*     (2006.01)
    *G02F 1/1337*     (2006.01)
    *G02F 1/13357*     (2006.01)

(52) U.S. Cl.
    CPC .. *G02F 1/133615* (2013.01); *G02F 1/133707* (2013.01); *G02F 1/134309* (2013.01); *G02F 1/133565* (2021.01); *G02F 1/134363* (2013.01); *G02F 2201/121* (2013.01); *G02F 2201/123* (2013.01); *G02F 2201/305* (2013.01); *G02F 2203/34* (2013.01)

(58) Field of Classification Search
    CPC .... G02B 6/00; G02B 6/02076; G02B 6/0043; G02B 6/0011; G02B 6/0015; G02B 5/32; G02B 5/1842; G02B 5/18; G02B 5/1819; G02B 2006/12107; G02B 26/106; G02F 1/1326; G02F 1/133615; G02F 1/133504; G02F 1/134309; G02F 1/133514; G02F 1/13306; G02F 1/133524; G02F 1/133621; G02F 1/133606; G02F 1/1343; G02F 1/134345; G02F 1/134363; G02F 1/225; G02F 1/1335; G02F 1/133507; G02F 1/133565; G02F 1/1336; G02F 1/133638; G02F 1/134372; G02F 1/133707; G02F 2201/305; G02F 2201/307; G02F 2201/30; G02F 2201/121; G02F 2201/123; G02F 2201/302; G02F 2203/34; G02F 2203/30
    See application file for complete search history.

(56) References Cited

U.S. PATENT DOCUMENTS

| | | |
|---|---|---|
| 2015/0234221 A1 | 8/2015 | Anderson et al. |
| 2016/0091775 A1 | 3/2016 | Gibson et al. |
| 2018/0088438 A1 | 3/2018 | Wang et al. |
| 2018/0107059 A1 | 4/2018 | Zhao et al. |
| 2019/0004365 A1 | 1/2019 | Tan et al. |
| 2019/0129082 A1 | 5/2019 | Li et al. |
| 2019/0339566 A1 | 11/2019 | Tan et al. |

FOREIGN PATENT DOCUMENTS

| | | |
|---|---|---|
| CN | 105589256 A | 5/2016 |
| CN | 205318033 U | 6/2016 |
| CN | 106292049 A | 1/2017 |
| CN | 106292051 A | 1/2017 |
| CN | 106324898 A | 1/2017 |
| CN | 106444177 A | 2/2017 |
| CN | 206074956 U | 4/2017 |
| CN | 106647004 A | 5/2017 |
| CN | 106681047 A | 5/2017 |
| JP | H02287441 A | 11/1990 |
| JP | 03015831 B | 1/1991 |
| WO | WO2014081415 A1 | 5/2014 |

OTHER PUBLICATIONS

Chinese Office Action dated Mar. 28, 2019.
Search Report and Written Opinion dated Oct. 18, 2017 from State Intellectual Property Office of the P.R. China.

ically only show a mutual position relationship among different objects, thus, the light field 3D display has become the research hotspot in recent years.

DISPLAY DEVICE AND DISPLAY METHOD THEREOF

CROSS-REFERENCE TO RELATED APPLICATIONS

The present application is a divisional application of U.S. patent application Ser. No. 15/742,721 filed Jan. 8, 2018, which was the National Stage of International Application No. PCT/CN2017/093879 filed Jul. 21, 2017 which claims priority from Chinese Patent Application No. 201610921400.5 filed on Oct. 21, 2016, the entire contents of each which are incorporated by reference herein.

TECHNICAL FIELD

The present disclosure relates to a technical field of display, and particularly, to a display device and a display method thereof.

BACKGROUND

Along with development of the photoelectric technology and devices, image display is not limited to a two-dimensional (2D) screen any more, and a three-dimensional (3D) image display is more and more applied to aspects of people's daily work, study, entertainment and the like.

One of three-dimensional display modes is that a light field display technology is utilized to implement 3D display, and the light field 3D display not only can really reproduce the special characteristics of a 3D scene, but also can correctly show a mutual position relationship among different objects, thus, the light field 3D display has become the research hotspot in recent years.

SUMMARY

Embodiments of the present disclosure provide a display device and a display method thereof, which can regulate an amount of the light output from a waveguide grating by controlling changes of a refractive index of a liquid crystal layer so as to implement gray scale display.

In first aspect of the present disclosure, it is provided a display device, comprising: a first base substrate and a second base substrate which are arranged oppositely, and a liquid crystal layer between the first base substrate and the second base substrate, wherein the display device further comprises: a waveguide grating between the liquid crystal layer and the first base substrate, wherein the waveguide grating comprises a waveguide layer and a grating layer on a side of the waveguide layer which faces the liquid crystal layer, and the grating layer is in contact with the liquid crystal layer; and a collimation light source on a lateral surface of the waveguide layer, wherein a light emitted by the collimation light source is coupled into the waveguide layer and output from the grating layer.

In second aspect of the present disclosure, it is provided a display method applied to the display device according to any one of claims 1 to 13, comprising: scanning pixels in the display device row by row; and while scanning one row of pixels, applying an electric field to the liquid crystal layer of the scanned pixels according to a gray scale value of each pixel, so that the refractive index of the liquid crystal layer of the pixels is between a minimum refractive index of the liquid crystal layer and a maximum refractive index of the liquid crystal layer.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
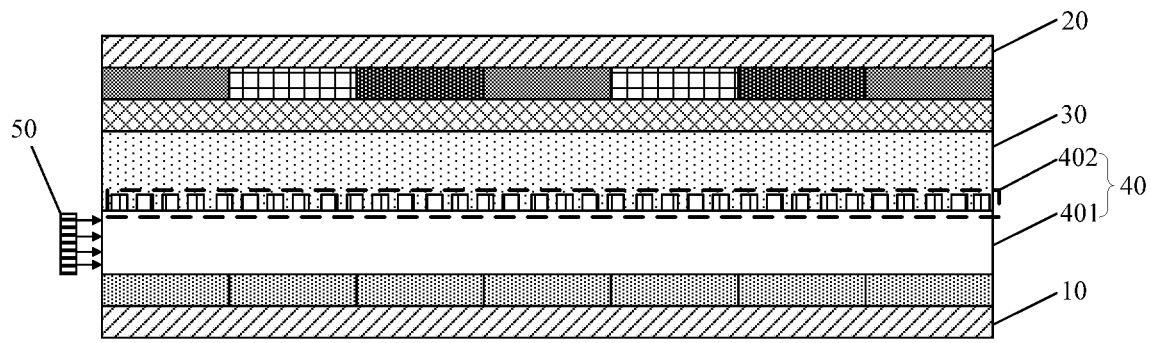
FIG. 1 is a structural schematic diagram of a display device provided by an embodiment of the present disclosure.

An embodiment of the present disclosure provides a display device. As illustrated in FIG. 1, the display device comprises: a first base substrate 10 and a second base substrate 20 which are arranged opposite to each other, and a liquid crystal layer 30 positioned between the first base substrate 10 and the second base substrate 10. For example, the first base substrate 10 and the second base substrate 20 are made of optical glass or a resin material, and both have thicknesses of, for example, from 0.1 mm to 2 mm. It can be contemplated that the thicknesses of the first and second base substrates are not defined in the present disclosure and can be determined according to design or process conditions of a product particularly.

As illustrated in FIG. 1, the display device further comprises: a waveguide grating 40 positioned between the liquid crystal layer 30 and the first base substrate 10. The waveguide grating 40 comprises a waveguide layer 401 and a grating layer 402 positioned on the surface of one side of the waveguide layer 401 facing the liquid crystal layer 30, and the grating layer 402 being in contact with the liquid crystal layer 30; moreover, a collimation light source 50 positioned on the lateral surface of the waveguide layer 401, wherein light emitted by the collimation light source 50 is coupled into the waveguide layer 401 and the light is output by the grating layer 402.

On this basis, a refractive index of the liquid crystal layer 30 is changed between a maximum refractive index $N_{max}$ and a minimum refractive index $N_{min}$ under the control of a driving signal of the display device, and a refractive index N of the grating layer 402 is greater than or equal to the minimum refractive index $N_{min}$ of the liquid crystal layer 30, and smaller than or equal to the maximum refractive index $N_{max}$ of the liquid crystal layer 30, i.e., $N_{min} \leq N \leq N_{max}$, so that the refractive index of the liquid crystal layer can be regulated by driving liquid crystal molecules in the liquid crystal layer to be deflected. In such case, while the refractive index of the liquid crystal layer is regulated to be equal to that of the grating layer, the effect of the grating layer cannot be exhibited and no light is output from the waveguide grating, so the display device is in a dark state at this moment; while a difference between the refractive index of the liquid crystal layer and the refractive index of the grating layer is regulated to be the maximum, the effect of the grating layer is the most obvious, light extraction efficiency of the waveguide grating is the highest, so the display device is in a bright state at this moment. Namely, by controlling changes of the refractive index of the liquid crystal layer, the difference between the refractive index of the liquid crystal layer and the refractive index of the grating layer can be regulated, so that the purpose of controlling the light extraction amount of the waveguide grating can be achieved, thereby implementing different gray scale display.

It should be noted herein that, the refractive index N of the liquid crystal layer 30 is changed between the maximum refractive index $N_{max}$ and the minimum refractive index $N_{min}$ under the control of the driving signal of the display device, means that the liquid crystal molecules in the liquid crystal layer 30 are deflected under the effect of an electric field. The refractive index of the liquid crystal layer 30 can be regulated by driving an included angle between an optical axis of the liquid crystal molecules and a polarization direction of light output from the waveguide grating. For example, when the optical axis of the liquid crystal molecules is driven to be parallel to the polarization direction, the refractive index of the liquid crystal layer is the maximum; when the optical axis of the liquid crystal molecules is driven to be perpendicular to the polarization direction, the refractive index of the liquid crystal layer is the minimum. As an example, a thickness of the liquid crystal layer 30 is set in a range from 500 nm to 5 μm, for example, approximately 1 μm. It can be contemplated that the thickness of the liquid crystal layer 30 is not defined in the present disclosure and can be set according to the type, parameters of the display device or the like.

It should be further noted herein that the liquid crystal molecules in the liquid crystal layer in the display device may be nematic phase liquid crystals, may be blue phase liquid crystals, or may also be other types of liquid crystals, which is not defined in the present disclosure, as long as it can be ensured that changes of the refractive index of the liquid crystal layer 30 is implemented by regulating intensity of the electric field applied to the liquid crystal layer 30. In addition, the display device in the present disclosure may be known liquid crystal display device, such as any product or part with a display function, e.g., a liquid crystal display, a liquid crystal television, a digital photo frame, a mobile phone or a tablet personal computer and the like. It also may be a near-to-eye 3D display device, a virtual reality display device, an augmented reality display device and the like, which are not defined in the present disclosure.

A working principle and related setting of the above-mentioned waveguide grating 40 will be briefly illustrated below.

Figure 2:
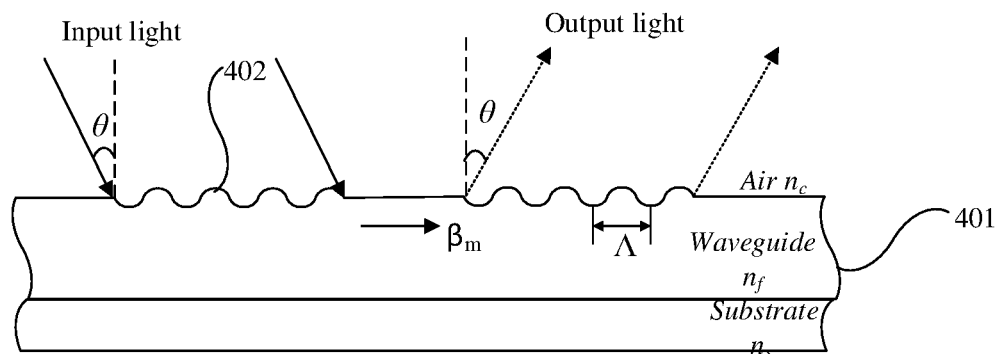
FIG. 2 is a principle schematic diagram of a waveguide grating provided by an embodiment of the present disclosure.

As illustrated in FIG. 2, the principle schematic diagram of the waveguide grating 40 is illustrated by taking cases that an upper dielectric layer is the air and has a refractive index of $n_c$, a lower dielectric layer is a transparent substrate and has a refractive index of $n_s$ and the refractive index of the waveguide layer is $n_f$ as examples. In the example, the refractive index of the waveguide layer 401 is greater than the refractive index of the upper dielectric layer and is greater than the refractive index of the lower dielectric layer, i.e., $n_f$ is greater than $n_c$ and $n_f$ is greater than $n_s$, so as to achieve normal functions of the waveguide grating. The waveguide grating 40 couples external light from the outside into the waveguide layer 401, i.e., carries out input coupling, and couples out the light from the waveguide layer 401 through the grating layer 402, i.e., carries out output coupling. The magnitude of component $\beta_m$ of the wave vector of a certain order of diffracted light along the propagation direction of the guided mode satisfies the phase matching condition $\beta_q = \beta_m - qK$ ($q=\pm1, \pm2 \ldots$), wherein $\beta_m$ represents a propagation constant of an m-order guided mode, $\beta_m = k_0 N_m$, wherein $N_m$ represents an effective refractive index of the m-order guided mode, and $k_0$ is a constant; and K represents a grating vector.

In addition, the waveguide layer 401, for example, is made of a transparent material, e.g., resin, glass, silicon nitride and the like, and a refractive index of the transparent material is at least greater than those of adjacent layers. In addition, in order to ensure that light emitted by the collimation light source 50 arranged on the lateral surface of the waveguide layer 401 is coupled into the waveguide layer 401 to the greatest extent, for example, a thickness of the waveguide layer 401 is set in a range from 100 nm to 100 µm.

The collimation light source 50 may be formed of a red-green-blue trichromatic semiconductor laser chip, or may be formed of a red-green-blue trichromatic Light Emitting Diode (LED) chip via collimation and beam expansion, or may be formed of a white light LED chip via collimation and beam expansion, or may be formed of a strip Cold Cathode Fluorescent Lamp (CCFL) along with some light collimation structures, which is not defined herein.

Moreover, the grating layer 402 positioned on the surface of the waveguide layer 401 also may be made of transparent material, e.g., resin, silicon oxide and the like. The maximum diffraction efficiency of a grating for light, for example, is generated when a duty ratio is 0.5. But in the actual product design, the duty ratio may be deviated from 0.5, and can be specifically set according to intensity of emergent light, process conditions, brightness difference at different positions of a display panel, and the like, which is not defined in the present disclosure. In addition, a height of a grid in the grating layer 402, for example, is set in a range of 100 nm to 1,500 nm, and for example, can be set as 500 nm. It can be contemplated that, according to actual demands, the heights of the grids corresponding to all sub-pixel units are equal to one another, or the heights of the grids corresponding to different sub-pixel units are different from one another, which is not defined in the present disclosure.

On this basis, in order to increase a difference value between the refractive index of the liquid crystal layer 30 and the refractive index of the grating layer 402, for example, the refractive index N of the grating layer 402 is equal to the minimum refractive index $N_{min}$ of the liquid crystal layer 30, i.e., $N=N_{min}$; or, the refractive index N of the grating layer 402 is equal to the maximum refractive index $N_{max}$ of the liquid crystal layer 30, i.e., $N=N_{max}$. Therefore, a regulation range of gray scale display can be enlarged, so that accuracy of gray scale regulation is improved.

When the refractive index N of the grating layer 402 is equal to the minimum refractive index $N_{min}$ of the liquid crystal layer 30, or the refractive index N of the grating layer 402 is equal to the maximum refractive index $N_{max}$ of the liquid crystal layer 30, the difference value between the refractive index of the liquid crystal layer 30 and the refractive index of the grating layer is in a range from zero to ($N_{max}-N_{max}$), i.e., the difference value from zero to ($N_{max}-N_{min}$) corresponds to a gray scale from L0 to L255. When the refractive index N of the grating layer 402 is set as between the minimum refractive index $N_{min}$ and the maximum refractive index $N_{max}$, i.e., $N_{min}<N<N_{max}$, the difference value between the refractive index of the liquid crystal layer 30 and the refractive index of the grating layer 402 is in a range from zero to ($N_{max}-N$) or from zero to ($N-N_{min}$), and the difference value of zero to ($N_{max}-N$) or zero to ($N-N_{min}$) corresponds to the gray scale of L0 to L255.

In view of above, while $N_{min}<N<N_{max}$, it can be seen that a value of ($N_{max}-N_{min}$) is greater than values of ($N_{max}-N$) and ($N-N_{min}$), so that a range from zero to ($N_{max}-N_{min}$) is larger than a range from zero to ($N_{max}-N$) and is larger than a range from zero to ($N-N_{min}$), so that a regulation range of the corresponding gray scale of L0 to L255 is enlarged and the accuracy is increased.

It should be noted herein that when the electric field is not applied, in a case that the refractive index of the grating layer 402 is equal to the refractive index of the liquid crystal layer 30, the display device is in the dark state, i.e., the display device is in a normal black mode; when the electric field is not applied, in a case that the difference value of the refractive index of the grating layer 402 and the refractive index of the liquid crystal layer 30 is the maximum, the display device is in the bright state, and the display device is in a normal white mode. The present disclosure does not limit to the above embodiment, and in the application process, setting of the normal black mode or the normal white mode can be carried out according to actual demands.

Figure 3:
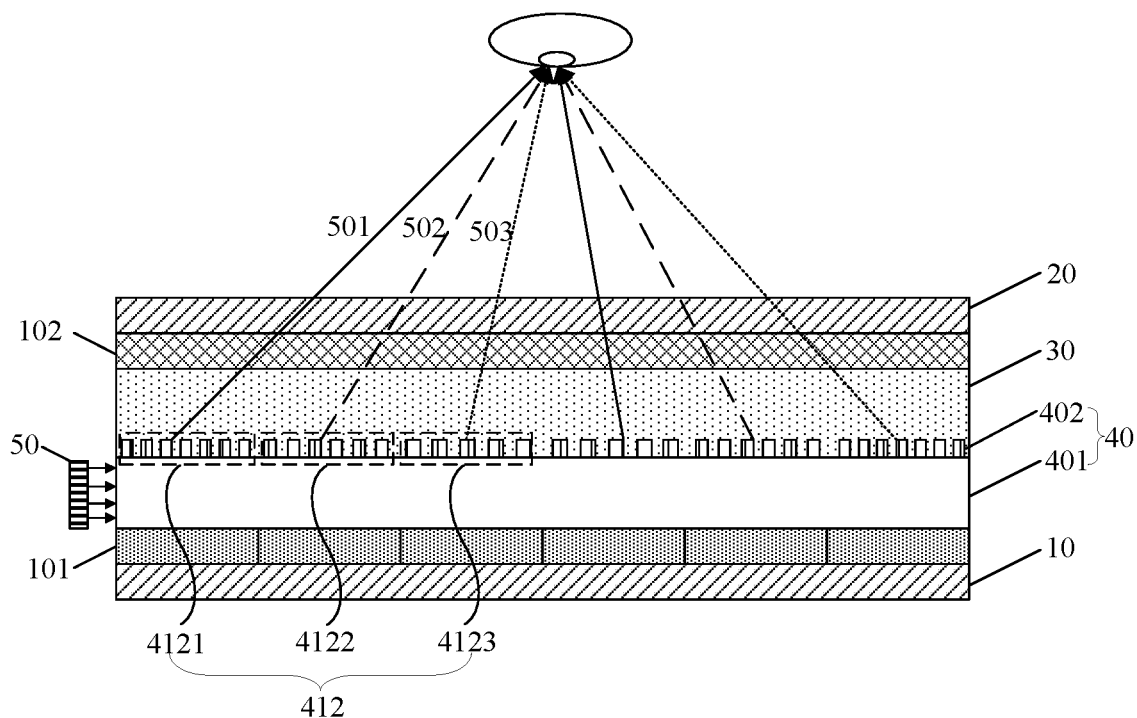
FIG. 3 is a structural schematic diagram of another display device provided by an embodiment of the present disclosure.

At least in some of the embodiments, as illustrated in FIG. 3, the grating layer 402 comprises: a grating unit 412 arranged in an array; the grating unit 412 comprises a first grating sub-unit 4121, a second grating sub-unit 4122 and a third grating sub-unit 4123; the first grating sub-unit 4121 is configured for outputting first primary color light 501 (for example, red light) along a direction of facing human eyes; the second grating sub-unit 4122 is configured for outputting second primary color light 502 (e.g., green light) along a direction of facing human eyes; and the third grating sub-unit 4123 is configured for outputting third primary color light 503 (e.g., blue light) along a direction of facing human eyes. Therefore, three primary lights emitted by each grating unit 412 of the grating layer 402 are all converged at the human eyes, so that near-to-eye display can be implemented. In addition, in the display device adopting the waveguide grating, different grating sub-units in each grating unit 412 can emit different primary colors of light which are directly converge to the human eyes, so that the display device can implement color display of a display image without arranging a color filter layer. In order to effectively ensure purity and saturation of colors of the emitted light, the color filter layer may also be arranged, which is not defined in the present disclosure.

In addition, the emergent light of conventional LCD panel or conventional OLED panel is divergent light, thus, it is difficult to implement single-eye focusing near-to-eye display; but in the above-mentioned display device, the emergent light can be effectively converged so as to benefit for implementing single-eye focusing near-to-eye display.

At least in some of the embodiments, the grating unit 412 arranged in the array is in one-to-one correspondence with the pixel unit in the display device, for example, in the present disclosure, the pixel unit comprises a first sub-pixel unit (e.g., a red sub-pixel unit), a second sub-pixel unit (e.g., a green sub-pixel unit) and a third sub-pixel unit (e.g., a blue sub-pixel unit), while the grating unit 412 comprises the first grating sub-unit 4121, the second grating sub-unit 4122 and the third grating sub-unit 4123, i.e., in the present disclosure, the first grating sub-unit 4121 corresponds to the first sub-pixel unit, the second grating sub-unit 4122 corresponds to the second sub-pixel unit, and the third grating sub-unit 4123 corresponds to the third sub-pixel unit.

At least in some embodiment, the grating unit 412 corresponds to a plurality of pixel units in the display device. For example, each grating sub-unit in the grating unit 412 is in one-to-one correspondence with one of columns of sub-pixel units in the pixel units of the display device, i.e., the first grating sub-unit 4121 corresponds to one column of first sub-pixel units (e.g., the red sub-pixel units), the second grating sub-unit 4122 corresponds to one column of second sub-pixel units (e.g., the green sub-pixel units), and the third grating sub-unit 4123 corresponds to one column of third sub-pixel units (e.g., the blue sub-pixel units), which is not defined in the present disclosure.

In addition, because the requirement of display definition becomes higher and higher, the display device with higher Pixels Per Inch (PPI) are desired, but the display device is limited to a production process and difficult to increase the PPI. In the present disclosure, due to a case that the above-mentioned grating has a small period, e.g., from 100 nm to 1 μm, width of each the first grating sub-unit 4121, the second grating sub-unit 4122 and the third grating sub-unit 4123 is relatively small, so that the sub-pixel units corresponding to the first grating sub-unit 4121, the second grating sub-unit 4122 and the third grating sub-unit 4123 are relatively small in size, thereby benefiting for higher PPI of the display device.

A specific principle that the first grating sub-unit 4121 is configured for outputting the first primary color light 501 in the direction of facing the human eyes, the second grating sub-unit 4122 is configured for outputting the second primary color light 502 in the direction of facing the human eyes and the third grating sub-unit 4123 is configured for outputting the third primary color light 503 in the direction of facing the human eyes will be further illustrated below.

As illustrated in FIG. 2, for the light output from the waveguide grating 40, both the light wavelength λ and the included angle θ between the light outgoing direction and a normal of the panel plane satisfy the following relationship: $2\pi/\lambda \cdot N_m = 2\pi/\lambda \cdot n_c \sin\theta + q2\pi/\Lambda$, wherein Λ represents a grating period, and $n_c$ represents the refractive index of the air.

On this basis, for the near-to-eye display device, a position where the human eyes acquire an image is fixed, i.e., the light extraction direction of each sub-pixel unit is fixed. In the relationship formula $2\pi/\lambda \cdot N_m = 2\pi/\lambda \cdot n_c \sin\theta + q2\pi/\Lambda$, the included angle θ between the light outgoing direction of each sub-pixel unit and the normal of panel plane is a fixed value, and both q and $N_m$ are known parameters, so that the grating period Λ of the grating layer 402 corresponding to each sub-pixel unit can be determined according to the color (i.e., the wavelength λ) of the emergent light of different sub-pixel units. That is, the light of a given color (the wavelength λ) can be output in a given direction (the included angle θ is formed between the give direction and the normal of the panel plane) by setting the grating period Λ. Embodiments of the present disclosure is further illustrated by taking a case that the display device is the near-to-eye display device as an example.

Existing display device, for example, include vertical field display device and flat field display device, wherein the vertical field display device includes, for example, a quasi Electrically Controlled Birefringence (ECB) type display device and a quasi Vertical Alignment (VA) display device; and the flat field display device include, for example, a quasi Advanced-Super Dimensional Switching (ADS) type display device, a quasi In-Plane Switch (IPS) type display device and the like.

The display device in the present disclosure may be applied to the vertical field display device or the flat field display device, which will be further illustrated below by the specific embodiments.

As illustrated in FIG. 3, the display device provided by an embodiment of the present disclosure is the vertical field (quasi ECB) display device and comprises a pixel electrode 101 and a common electrode 102, the pixel electrode 101 and the common electrode 102 are positioned on two opposite sides of a liquid crystal layer 30. By regulating a voltage applied to the pixel electrode 101 and the common electrode 102, a difference value between a refractive index of the liquid crystal layer 30 and a refractive index of a grating layer 402 is changed so as to implement regulation of different gray scales.

For example, in a case that the pixel electrode 101 and the common electrode 102 are not supplied with the voltage, the refractive index of the liquid crystal layer 30 is the same as the refractive index of the grating layer 402, the effect of the grating layer 402 cannot be exhibited, and no light is output from the waveguide grating 40, the display device is in a dark state at this moment, which corresponds to a gray scale L0. When different voltages are respectively applied to the pixel electrode 101 and the common electrode 102, the refractive index of the liquid crystal layer 30 is different from the refractive index of the grating layer 402, the display device is in a state of brightness between L1 and L255 at this moment. It can be contemplated that, in another embodiment, the pixel electrode 101 and the common electrode 102 are not applied with the voltage, the difference between the refractive index of the liquid crystal layer 30 and the refractive index of the grating layer 402 is the maximum, the display device is in a bright state at this moment, which corresponds to a gray scale L255; when different voltages are respectively applied to the pixel electrode 101 and the common electrode 102, the refractive index of the liquid crystal layer 30 is different from the refractive index of the grating layer 402, and the display device is in a state of brightness between L0 and L254 at this moment. Namely, the refractive index of the liquid crystal layer 30 is driven to be changed by the pixel electrode 101 and the common electrode 102, so that the amount of light coupled out of the waveguide grating 40 can be regulated, thereby implementing regulation of different gray scales.

On this basis, by setting grating periods of the first grating sub-unit 4121, the second grating sub-unit 4122 and the third grating sub-unit 4123 in each grating unit 412 of the grating layer 402, the first primary color light 501 emitted by the first grating sub-unit 4121, the second primary color light 502 emitted by the second grating sub-unit 4122 and the third primary color light 503 emitted by the third grating sub-unit 4123 in the grating unit 412 are all converged at human eyes, so that the display device can implement near-to-eye display without arranging a color filter layer. In order to effectively ensure purity and saturation of colors of the emergent light, the color filter layer may also be arranged, which is not defined in the present disclosure.

Figure 4:
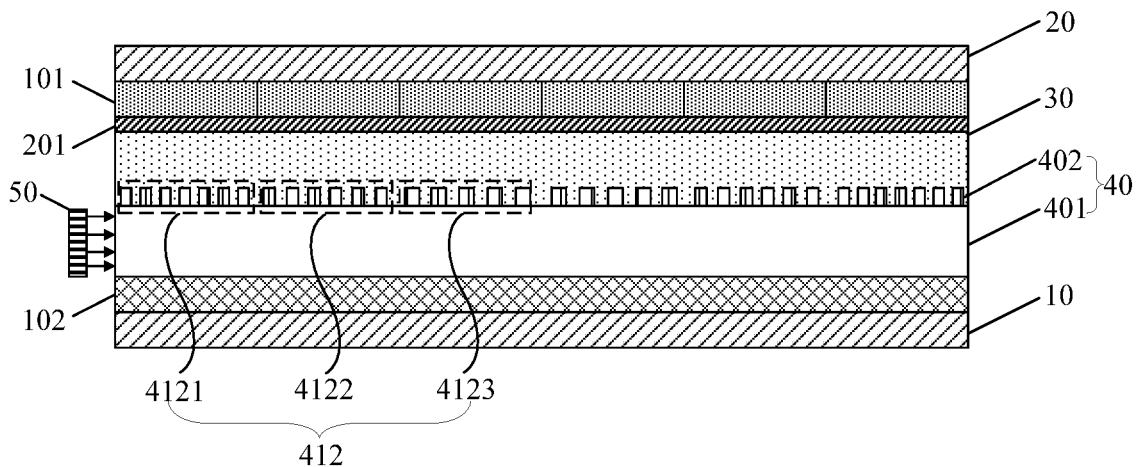
FIG. 4 is a structural schematic diagram of yet another display device provided by an embodiment of the present disclosure.

It should be noted herein that for the above-mentioned vertical field display device, the pixel electrode 101 and the common electrode 102 are positioned on two opposite sides of the liquid crystal layer 30. For example, as illustrated in FIG. 3, the pixel electrode 101 is positioned on one side of the waveguide grating 40, which faces a first base substrate 10, and the common electrode 102 is positioned on one side of the waveguide grating 40, which faces a second base substrate 20. In another embodiment, as illustrated in FIG. 4, the common electrode 102 is positioned on one side of the liquid crystal layer 30, which faces the first base substrate 10, and the pixel electrode 101 is positioned on one side of the liquid crystal layer 30, which faces the second base substrate 20. The specific locations of the pixel and common electrodes are not defined in the present disclosure.

In addition, liquid crystal molecules of the liquid crystal layer 30 in the vertical field display device may be nematic phase liquid crystal molecules, or blue phase liquid crystal molecules. For example, specific application of the nematic phase liquid crystal molecules and the blue phase liquid crystal molecules will be further illustrated below.

In a case of adopting the nematic phase liquid crystal molecules, a display principle of the display device and an arrangement of a polarizer will be further illustrated by examples.

For example, by taking a case that an initial refractive index of the liquid crystal layer 30 is equal to $n_0$ as an example, when the refractive index of the liquid crystal layer and the refractive index of the grating layer 402 are equal to each other and both are $n_0$, the effect of the grating layer 402 cannot be exhibited, no light is coupled out of the waveguide grating 40, at this moment, the gray scale is the minimum and the display device is in an L0 state. When the difference value between the refractive index $n_e$ of the liquid crystal layer 30 and the refractive index $n_0$ of the grating layer 402 is the maximum, the effect of the grating layer 402 is the most obvious, efficiency of the light coupled out of the waveguide grating 40 is the highest, at this moment, the gray scale is the maximum and the display device is in an L255 state. When the refractive index of the liquid crystal layer 30 is between the two cases, the display device is in other gray scale states.

In the displaying mode, when the refractive index of the grating layer 402 is equal to or approximately equal to the refractive index $n_0$ of the liquid crystal layer 30 and a polarization direction of the light coupled out of the waveguide grating 40 is parallel to the first base substrate 10 and perpendicular to a length direction of a grid of the grating layer 402, the light output from the waveguide grating 40 may respond to the change of the refractive index, and light in other polarization directions cannot respond to the change of the refractive index. In such case, the display device can implement normal display without adding the polarizer on a light outgoing side or requesting that light emitted from a collimation light source 50 is polarized light. When the refractive index of the grating layer 402 is positioned between the refractive indices $n_0$ and $n_e$ of the liquid crystal layer 30, at the moment, the display device needs to add the polarizer on the light outgoing side or request that light emitted from a backlight source is polarized light (a layer of polarizer is added on the light output side of the side-lit collimation light source 50) so as to eliminate interference of the polarized light which is not under control of alignment deflection of the liquid crystal layer 30, thereby implementing normal display, and moreover, the display mode, for example, requests that the liquid crystal molecules are positive liquid crystal molecules.

In addition, in the case of adopting the nematic phase liquid crystal molecules, in order to ensure that the liquid crystal molecules have the same arrangement state in an initial state and are deflected in an desired mode after an electric field is applied, as illustrated in FIG. 4, the display device further comprises alignment layers 201 positioned on two opposite sides of the liquid crystal layer 30 and in contact with the liquid crystal layer 30, so that the nematic phase liquid crystal molecules have the same initial state under the effect of the alignment layer 201, and the liquid crystal molecules are rotated in the above-mentioned mode when a voltage is applied and be deflected according to a preset angle, thereby implementing regulation of the refractive index of the liquid crystal layer 30.

For example, the alignment layer 201 is positioned on one side of the liquid crystal layer 30, which is proximal to a waveguide layer 401. Alternatively, as illustrated in FIG. 4, the alignment layer 201 is positioned on one side of the liquid crystal layer 30, which is distal to the waveguide layer 401, which is not defined in the present disclosure. In an embodiment, the alignment layer 201 is arranged on one side of the liquid crystal layer 30 distal to the waveguide layer 401, in order to eliminate the influence of the refractive index of the liquid crystal layer 30 due to the alignment 201 being positioned between the grating layer 402 and the liquid crystal layer 30, which may further influence the amount of light output from the waveguide grating.

For example, the alignment layer 201 is a polyimide (PI) film, the initial state of the liquid crystal molecules is that the liquid crystal molecules are parallel to the plane of a display panel, and the liquid crystal molecules are deflected along a direction perpendicular to the plane of the display panel after being powered up. It can be contemplated that, a special nematic phase liquid crystal material may also be adopted, and initial alignment of the liquid crystal molecules is implemented by adding some materials instead of the alignment layer 201, which is not defined in the present disclosure.

In a case of adopting the blue phase liquid crystal molecules, when no electric field is applied to the blue phase liquid crystal molecules, the liquid crystal molecules are isotropic and are the same in refractive index in each direction, the refractive indices of two types of polarized light passing through liquid crystals are the same to each other and both are n. When the blue phase liquid crystal molecules are applied with the electric field, the liquid crystal molecules are anisotropic, the refractive index of an ordinary light is $n_1$, the refractive index of extraordinary light is $n_2$, at the moment, $n_1<n<n_2$. In such case, an isotropic state can be selected to be the L0 state (the refractive index of the grating layer is also n), an anisotropic state can be selected to be the L255 state, at this moment, both two types of polarized light are coupled out and have high light extraction efficiency. It can be contemplated that, the anisotropic state may also be selected to be the L0 state (the refractive index of the grating layer is $n_1$ or $n_2$), the isotropic state can be selected to be the L255 state, at this moment, incident light needs to be the polarized light, or the polarizer needs to be added on the light outgoing side so as to implement normal display.

Moreover, the display device may also select a quasi VA type display mode, i.e., the liquid crystal molecules is aligned to be perpendicular to the plane of the display panel in an initial state, and after a flat electric field is applied, alignment of the liquid crystal molecules is gradually changed to be parallel to the plane of the display panel.

The VA type display device will be further explained and illustrated below by taking the nematic phase liquid crystal molecules as the example. For example, by taking a case that the initial refractive index of the liquid crystal layer 30 is equal to $n_0$, when the refractive index of the liquid crystal layer 30 and the refractive index of the grating layer 402 are equal to each other and both are $n_0$, the effect of the grating layer 402 cannot be exhibited, no light is coupled out of the waveguide grating 40, at this moment, the gray scale is the minimum and the display device is in the L0 state. When the difference value between the refractive index $n_e$ of the liquid crystal layer 30 and the refractive index $n_0$ of the grating layer 402 is the maximum, the effect of the grating layer 402 is the most obvious, efficiency of the light coupled out of the waveguide grating 40 is the highest, at this moment, the gray scale is the maximum and the display device is in the L255 state. When the refractive index of the liquid crystal layer 30 is between the two cases, the display device is in other gray scale states.

In the displaying mode, when the refractive index of the grating layer 402 is equal to or approximately equal to the refractive index $n_0$ of the liquid crystal layer 30 and a polarization direction of the light coupled out of the waveguide grating 40 is parallel to the first base substrate 10 and perpendicular to a length direction of a grid of the grating layer 402, the light output from the waveguide grating 40 may respond to the change of the refractive index, and light in other polarization directions cannot respond to the change of the refractive index. In such case, the display device can implement normal display without adding the polarizer on a light outgoing side or requesting that light emitted from a collimation light source 50 is polarized light. When the refractive index of the grating layer 402 is positioned between the refractive indices $n_o$ and $n_e$ of the liquid crystal layer 30, at the moment, the display device needs to add the polarizer on the light outgoing side or request that light emitted from a backlight source is polarized light so as to eliminate interference of the polarized light which is not under control of alignment deflection of the liquid crystal layer 30, thereby implementing normal display, and moreover, the display mode, for example, requests that the liquid crystal molecules are positive liquid crystal molecules.

In addition, for the VA type display mode, when the nematic phase liquid crystal molecules are adopted, in order to ensure that the liquid crystal molecules have the same arrangement state in the initial state and are deflected in an desired mode after an electric field is applied, the display device further comprises the alignment layers 201 positioned on two opposite sides of the liquid crystal layer 30 and in contact with the liquid crystal layer 30. It can be contemplated that, a special nematic phase liquid crystal material may also be adopted, and initial alignment of the liquid crystal molecules is implemented by adding some materials, as long as initial states of the nematic phase liquid crystal molecules are the same, so as to ensure that the liquid crystal molecules are rotated in the above-mentioned mode when the voltage is applied and be deflected according to a preset angle, thereby implementing regulation of the refractive index of the liquid crystal layer 30.

When the VA type display device adopts the blue phase liquid crystal molecules, the alignment layer 201 may not be arranged, and specific reasons and a related display principle can refer to illustration on adoption of the blue phase liquid crystal molecules in the above-mentioned quasi ECB type display device and are not repeated herein.

Figure 5A:
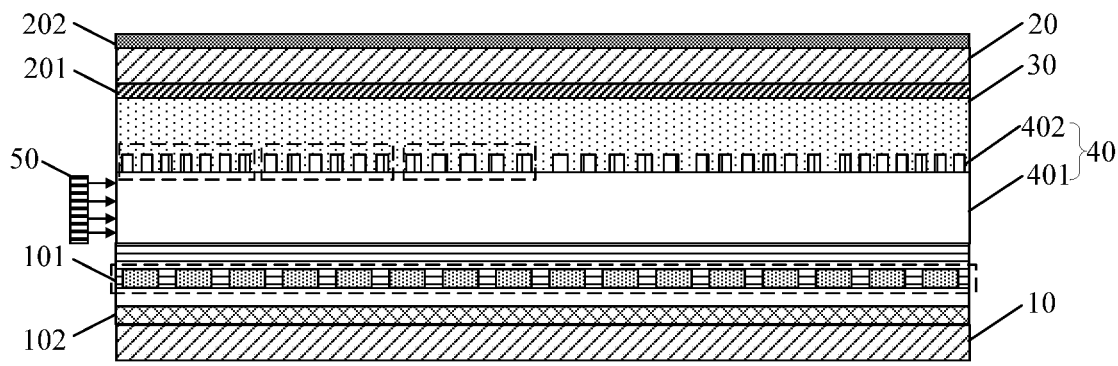
FIG. 5a is a structural schematic diagram of still another display device provided by an embodiment of the present disclosure.
Figure 5B:
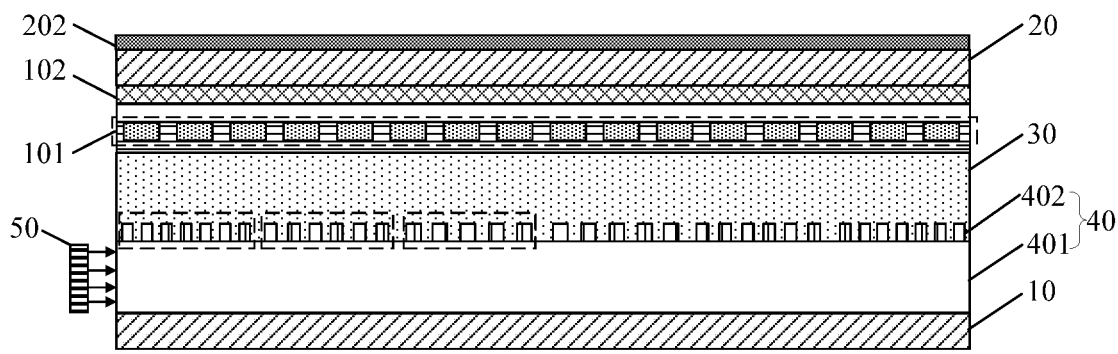
FIG. 5b is a structural schematic diagram of a display device provided by an embodiment of the present disclosure.
Figure 6A:
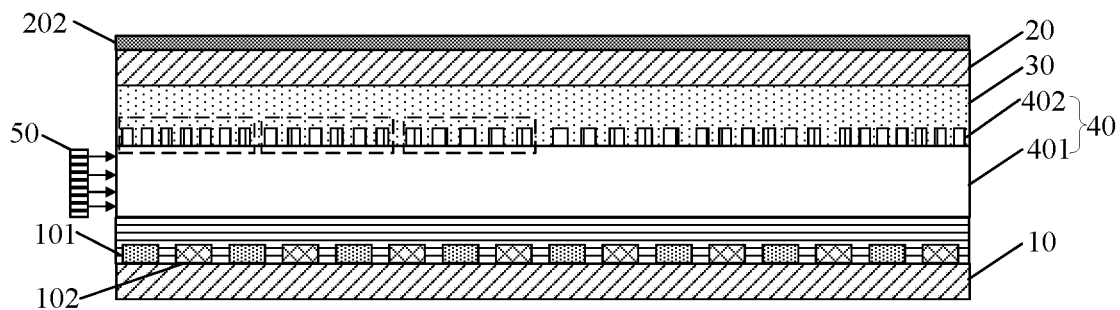
FIG. 6a is a structural schematic diagram of another display device provided by an embodiment of the present disclosure.
Figure 6B:
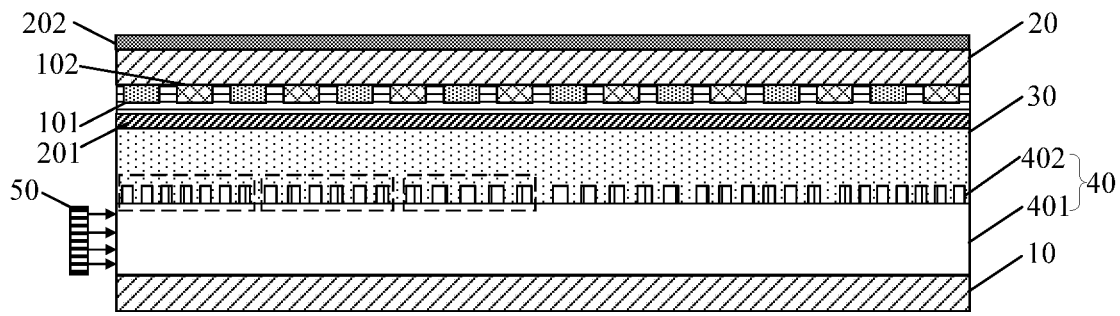
FIG. 6b is a structural schematic diagram of yet another display device provided by an embodiment of the present disclosure.

As illustrated in FIG. 5a to FIG. 6b, the display device provided by another embodiment of the present disclosure comprises a pixel electrode 101 and a common electrode 102, both the pixel electrode 101 and the common electrode 102 are positioned on the same side of the liquid crystal layer 30, and in such case, the display device is a flat field display device. FIG. 5a and FIG. 5b illustrate a quasi ADS type flat field display device which comprises a strip-shaped electrode and a plate-shaped electrode which are arranged on different layers; and FIG. 6a and FIG. 6b illustrate a quasi ISP type flat field display device which comprises strip-shaped electrodes arranged at intervals in the same layer. The flat field display device, by applying a voltage to the pixel electrode 101 and the common electrode 102 which are positioned on the same side of the liquid crystal layer 30, drives liquid crystal molecules in the liquid crystal layer 30 to rotate in a plane which is substantially parallel to the plane of a display panel so as to regulate a difference value between a refractive index of the liquid crystal layer 30 and a refractive index of a grating layer 402 and implement regulation of different gray scales.

For example, in a case that no voltage is applied to the pixel electrode 101 and the common electrode 102, the refractive index of the liquid crystal layer 30 is the same with the refractive index of the grating layer 402, the effect of the grating layer 402 cannot be exhibited, no light is coupled out of a waveguide grating 40, at this moment, the display device is in a dark state and corresponds to a gray scale L0. When different voltages are applied to the pixel electrode 101 and the common electrode 102, the refractive index of the liquid crystal layer 30 is different from the refractive index of the grating layer 402, and the brightness of the display device is between L1 and L255. It can be contemplated that, in the case that no voltage is applied to the pixel electrode 101 and the common electrode 102, the difference value between the refractive index of the liquid crystal layer 30 and the refractive index of the grating layer 402 is the maximum, at this moment, the display device is in a bright state and corresponds to a gray scale L255; when different voltages are applied to the pixel electrode 101 and the common electrode 102, the refractive index of the liquid crystal layer 30 is different from the refractive index of the grating layer 402, and the brightness of the display device is between L0 and L254. Namely, the refractive index of the liquid crystal layer 30 is driven to be changed by the pixel electrode 101 and the common electrode 102, so that the amount of light coupled out of the waveguide grating 40 can be regulated, thereby implementing regulation of different gray scales.

As the above-described embodiment, in the flat field display device, by setting grating periods of the first grating sub-unit 4121, the second grating sub-unit 4122 and the third grating sub-unit 4123 in each grating unit 412 of the grating layer 402, the first primary color light 501 emitted by the first grating sub-unit 4121, the second primary color light 502 emitted by the second grating sub-unit 4122 and the third primary color light 503 emitted by the third grating sub-unit 4123 in the grating unit 412 are all converged at human eyes, so that the display device can implement near-to-eye display.

In addition, specific arrangement of the pixel electrode 101 and the common electrode 102 in the above-mentioned quasi ADS type flat field display device and quasi IPS type flat field display device will be further illustrated.

For the quasi ADS type flat field display device, one of the pixel electrode 101 and the common electrode 102 is a strip-shaped electrode, and the other one is a plate-shaped electrode. For example, as illustrated in FIG. 5a, the strip-shaped pixel electrode 101 and the plate-shaped common electrode 102 are both positioned between the waveguide grating 40 and a first base substrate 10. As illustrated in FIG. 5b, the strip-shaped pixel electrode 101 and the plate-shaped common electrode 102 are both positioned between the liquid crystal layer 30 and a second base substrate 20. It can be contemplated that, FIG. 5a and FIG. 5b merely for illustration purpose by taking the strip-shaped pixel electrode 101 and the plate-shaped common electrode 102 as an example, the common electrode 102 may also be the strip-shaped electrode and the pixel electrode 101 may also be the plate-shaped electrode, as long as it is ensured that the strip-shaped electrode is proximal to the liquid crystal layer 30 with respect to the plate-shaped electrode and an effect of driving liquid crystal molecules in the liquid crystal layer 30 to be deflected can be achieved, so the present disclosure does not limit it.

For the IPS type flat field display device, the pixel electrode 101 and the common electrode 102 are both strip-shaped electrodes which arranged at an interval in the same layer. For example, as illustrated in FIG. 6a, the pixel electrode 101 and the common electrode 102 are arranged at an interval and both of them are positioned between the waveguide grating 40 and the first base substrate 10. Alternatively, as illustrated in FIG. 6b, the pixel electrode 101 and the common electrode 102 are arranged at an interval and both of them are positioned between the liquid crystal layer 30 and the second base substrate 20, which is not defined in the present disclosure.

On this basis, the liquid crystal molecules in the liquid crystal layer 30 in the above-mentioned quasi ADS type and quasi IPS type flat field display device may be nematic phase liquid crystal molecules, or blue phase liquid crystal molecules. Difference between the nematic phase liquid crystal molecules and the blue phase liquid crystal molecules in the specific application will be further illustrated below.

In a case of adopting the nematic phase liquid crystal molecules, a display principle of the quasi ADS type and quasi IPS type display device and a setting condition of a polarizer will be further illustrated by examples.

For example, by taking a case that an initial refractive index of the liquid crystal layer 30 is equal to $n_0$ as an example, when the refractive index of the liquid crystal layer and the refractive index of the grating layer 402 are equal to each other and both are $n_0$, the effect of the grating layer 402 cannot be exhibited, no light is coupled out of the waveguide grating 40, at this moment, the gray scale is the minimum and the display device is in an L0 state; when the difference value between the refractive index $n_e$ of the liquid crystal layer 30 and the refractive index $n_0$ of the grating layer 402 is the maximum, the effect of the grating layer 402 is the most obvious, efficiency of the light coupled out of the waveguide grating 40 is the highest, at this moment, the gray scale is the maximum and the display device is in an L255 state; and when the refractive index of the liquid crystal layer 30 is between the two cases, the display device is in other gray scale states.

In the display mode, a polarization direction of the light coupled out of the waveguide grating 40 can respond to changes of the refractive index both in a first direction and a second direction, wherein the first direction is a polarization direction parallel to the plane of the first base substrate 10 and perpendicular to a length direction of the strip-shaped electrode, and the second direction is a polarization direction parallel to the plane of the first base substrate 10 and parallel to the length direction of the strip-shaped electrode. Therefore, a polarizer needs to be added on a light outgoing side (e.g., an upper surface of the second base substrate 20) of the liquid crystal layer 30 or on a light emergent side of a side-lit collimation light source 50 to select one type of polarized light (first direction polarized light or second direction polarized light) so as to implement regulation of gray scales.

In addition, in the case of adopting the nematic phase liquid crystal molecules, in order to ensure that the liquid crystal molecules have the same arrangement state in an initial state and are deflected in an desired mode after an electric field is applied, the display device further comprises alignment layers 201 positioned on two opposite sides of the liquid crystal layer 30 and in contact with the liquid crystal layer 30, so that the nematic phase liquid crystal molecules have the same initial state under the effect of the alignment layer 201, and the liquid crystal molecules are rotated in the above-mentioned mode when a voltage is applied and be deflected according to a preset angle, thereby implementing regulation of the refractive index of the liquid crystal layer 30. In this display mode, the liquid crystal molecules may be positive liquid crystal molecules or negative liquid crystal molecules. In addition, by controlling a relationship of an initial direction of the liquid crystal molecules and a polarization analysis direction of the polarizer, the display panel is determined to be in a normal white mode (the initial direction of liquid crystals is consistent with the polarization analysis direction of the polarizer) or in a normal black mode (the initial direction of liquid crystals is perpendicular to the polarization analysis direction of the polarizer).

For example, when the above-mentioned quasi ADS type and quasi IPS type flat field display device adopt the nematic phase liquid crystal molecules, the alignment layers 201 are arranged on two opposite sides of the liquid crystal layer 30 and in contact with the liquid crystal layer 30. For example, the alignment layer 201 can be arranged on one side of the liquid crystal layer 30, which is proximal to the waveguide layer 401. Alternatively, as illustrated in FIG. 5a, the alignment layer 201 may also be arranged on one side of the liquid crystal layer 30 distal to the waveguide layer 401. It can be contemplated that, a special nematic phase liquid crystal material can also be adopted, and initial alignment of the liquid crystal molecules is implemented by adding some materials instead of the alignment layer 201, which is not defined in the present disclosure.

In the quasi ADS type and quasi IPS type display mode, when the blue phase liquid crystal molecules are adopted, due to the characteristics of the blue phase liquid crystal molecules, when the blue phase liquid crystal molecules are not applied with the electric field, the liquid crystal molecules are isotropic and are the same in refractive index in each direction, the refractive indices of two types of polarized light passing through liquid crystals are the same to each other and both are n. When the blue phase liquid crystal molecules are applied with the electric field, the liquid crystal molecules are anisotropic, the refractive index of an ordinary light is $n_1$, the refractive index of extraordinary light is $n_2$, at the moment, $n_1<n<n_2$. In such case, an isotropic state can be selected to be the L0 state (the refractive index of the grating layer is also n), an anisotropic state can be selected to be the L255 state, at this moment, both two types of polarized light are coupled out and have high light extraction efficiency. It can be contemplated that, the anisotropic state may also be selected to be the L0 state (the refractive index of the grating layer is $n_1$ or $n_2$), the isotropic state can be selected to be the L255 state, at this moment, incident light needs to be the polarized light, or the polarizer needs to be added on the light outgoing side so as to implement normal display.

When the quasi ADS type and quasi IPS type flat field display device adopts the blue phase liquid crystal molecules, the arrangement of the alignment layers 201 can be eliminated, specific reasons refer to arrangement of the alignment layer 201 in above-described embodiment, which is not repeated herein.

In further another embodiment, a grating layer 402 is consist of grids, and thus, the grating layer 402 may also be used as a pixel electrode 101 and/or a common electrode 102 when being used as a grating, at this moment, the grating layer 402 is of a grating and electrode composite structure. When the grating and electrode composite structure is adopted, due to a small grating period, an electric field formed by the grating and electrode composite structure is higher in density so as to facilitate controlling the liquid crystal layer 30, as a result, when a liquid crystal cell-gap is reduced, a responding speed of the display device is promoted and refresh frequency is improved.

The grating layer 402 may be used as the pixel electrode 101 and/or the common electrode 102 while being used as the grating, which will be further illustrated below.

Figure 7:
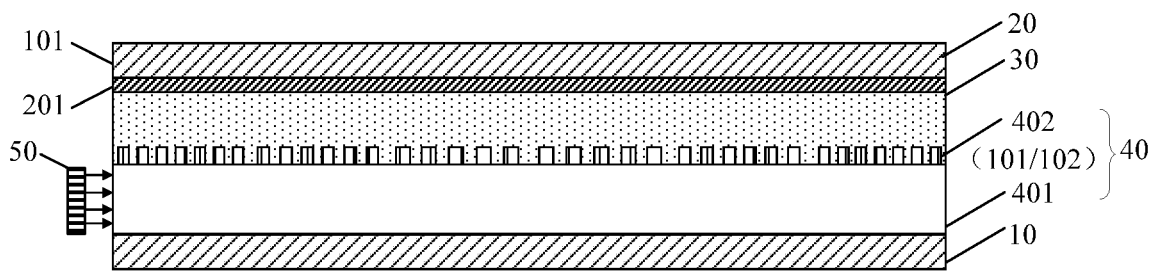
FIG. 7 is a structural schematic diagram of still another display device provided by an embodiment of the present disclosure.

For example, as illustrated in FIG. 7, the grating layer 402 simultaneously comprises the pixel electrode 101 and the common electrode 102, for example, part of the grids in the grating layer 402 are interconnected to form the pixel electrode 101, another part of the grids in the grating layer 402 are interconnected to form the common electrode 102. The grids for forming the pixel electrode 101 and the grids for forming the common electrode 102 are arranged at intervals, in such case, the display device is a quasi IPS type flat field display device.

Figure 8A:
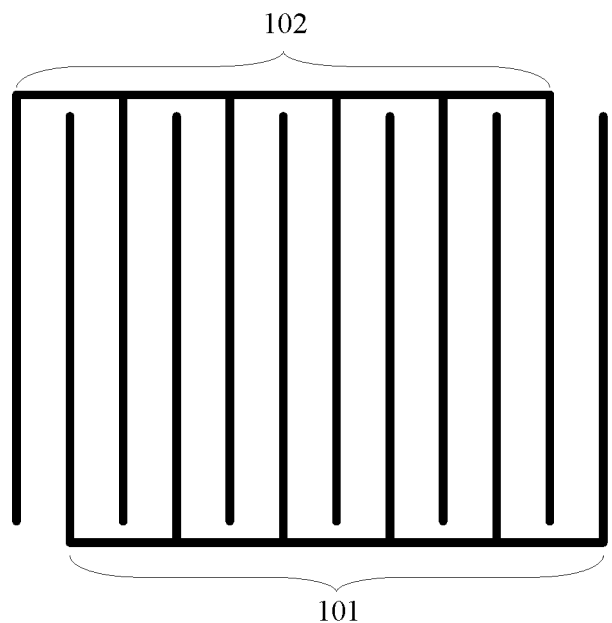
FIG. 8a is a structural schematic diagram of a grating layer provided by an embodiment of the present disclosure.
Figure 8B:
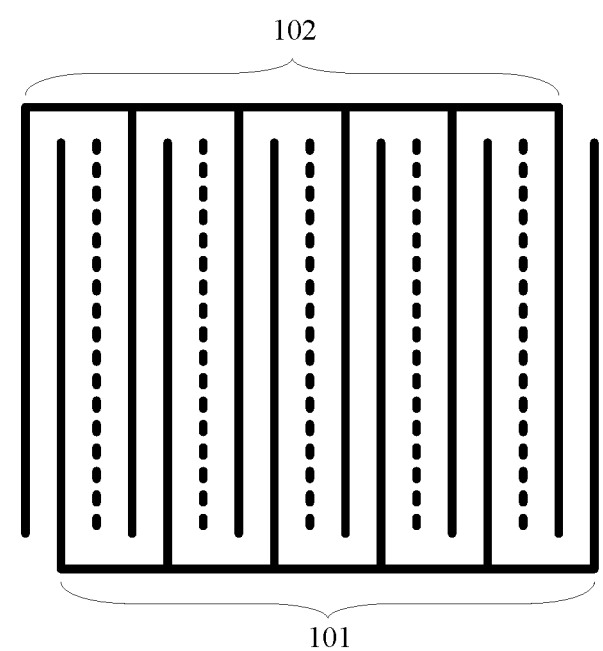
FIG. 8b is a structural schematic diagram of another grating layer provided by an embodiment of the present disclosure.

As illustrated in FIG. 8a, the two adjacent grids in the grating layer 402 respectively serve as the strip-shaped sub-electrodes of the pixel electrode 101 and the common electrode 102. Alternatively, as illustrated in FIG. 8b, the grids (illustrated as dotted lines in FIG. 8b) merely used as the gratings are disposed between the strip-shaped sub-electrode of the pixel electrode 101 and the strip-shaped sub-electrode of the common electrode 102, which is not defined in the present disclosure.

Figure 9:
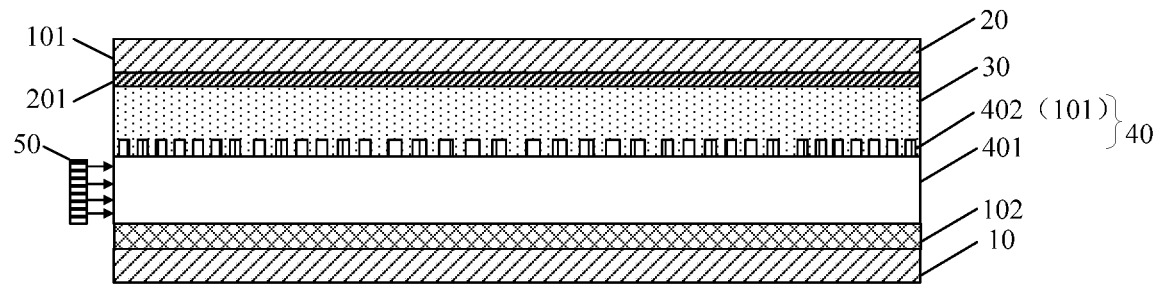
FIG. 9 is a structural schematic diagram of yet another display device provided by an embodiment of the present disclosure.

For further example, as illustrated in FIG. 9, part or all of the grids of the grating layer 402 are interconnected to form the pixel electrode 101, and the common electrode 102 is positioned between a waveguide grating 40 and a first base substrate 10. Alternatively, part or all of the grids of the grating layer 402 are interconnected to form the common electrode 102, and the pixel electrode 101 is positioned between the waveguide grating 40 and the first base substrate 10. In such case, the display device is a quasi ADS type flat field display device.

In addition, the regulation of gray scale in the quasi ADS type and quasi IPS type flat field display devices, liquid crystal molecules of the liquid crystal layer 30 selected from nematic phase liquid crystal molecules and blue phase liquid crystal molecules, settings related to an alignment layer 201 and a polarizer 202 and the like can refer to the description of the quasi ADS type and quasi IPS type flat field display device in above-mentioned embodiment, which will not be repeated herein.

At present, existing display device and particularly a virtual/augmented reality display device and a transparent display device are all implemented by an LCD and an OLED which adopt conventional structures and the polarizer. Due to that the polarizer will filter away at least half of light, the existing display device cannot achieve high transparence of the display panel, which adversely influences the light transmittance behind the panel and a transmission spectrum. In above-described embodiment of the present disclosure, it can be seen that when the display device in the present disclosure is one of quasi ECB type and quasi VA type display devices and a display device adopting blue phase liquid crystals, the need for the polarizer can be eliminated. Compared to the display device in the prior art, which has to use the polarizer, the display device of the present disclosure can greatly increase the light transmittance, so that transparence of the display panel is increased and meanwhile, a utilization rate of the light is increased.

Figure 10:
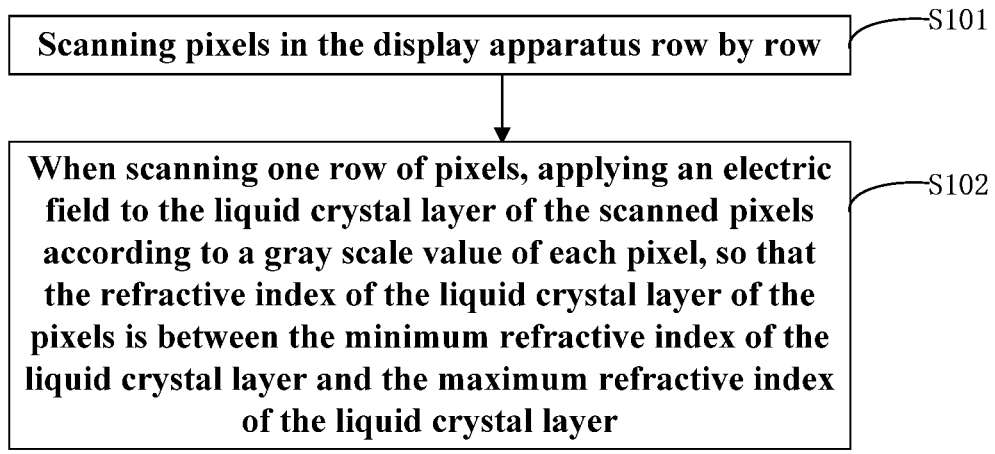
FIG. 10 is a flow chart of a display method applied to the display device, which is provided by an embodiment of the present disclosure.

An embodiment of the present disclosure further provides a display method applied to any one of the above-mentioned display device. As illustrated in FIG. 10, the display method comprises:

S101: scanning pixels in the display device row by row.

S102: when scanning one row of pixels, applying an electric field to the liquid crystal layer corresponding to the scanned pixels according to a gray scale value of each pixel, so that the refractive index of the liquid crystal layer in the scanned pixels is between the minimum refractive index of the liquid crystal layer and the maximum refractive index of the liquid crystal layer. Namely, by controlling changes of the refractive index of the liquid crystal layer, the difference value between the refractive index of the liquid crystal layer and the refractive index of the grating layer can be regulated, so that the purpose of controlling the amount of the light output from the waveguide grating can be achieved, thereby implementing different gray scale display.

On this basis, the refractive index of the grating layer is greater than or equal to the minimum refractive index of the liquid crystal layer, smaller than or equal to the maximum refractive index of the liquid crystal layer, and the grating layer is in contact with the liquid crystal layer, thus, the size of the refractive index of the liquid crystal layer can be regulated by driving the liquid crystal molecules in the liquid crystal layer to be deflected. In such case, when the refractive index of the liquid crystal layer and the refractive index of the grating layer are regulated to be equal to each other, the effect of the grating layer cannot be exhibited, no light is output from the waveguide grating, at this moment, the display device is in the dark state; when the difference value between the refractive index of the liquid crystal layer and the refractive index of the grating layer is regulated to be the maximum, the effect of the grating layer is the most obvious, efficiency of the light output from the waveguide grating is the highest, at this moment, the display device is in the bright state. Namely, by controlling changes of the refractive index of the liquid crystal layer, the difference value between the refractive index of the liquid crystal layer and the refractive index of the grating layer can be regulated, so that the purpose of controlling the amount of the light output from the waveguide grating can be achieved, thereby implementing different gray scale display.

The foregoing embodiments merely are exemplary embodiments of the disclosure, and not intended to define the scope of the disclosure, and the scope of the disclosure is determined by the appended claims.

The present application is based on and claims priority of the Chinese Patent Application No. 201610921400.5 filed on Oct. 21, 2016, the contents of which are incorporated herein by its reference in its entirety.

The invention claimed is:

1. A display device, comprising:
a first base substrate and a second base substrate which are arranged oppositely;
a liquid crystal layer between the first base substrate and the second base substrate;
a waveguide grating between the liquid crystal layer and the first base substrate, the waveguide grating comprising a waveguide layer and a grating layer on a side of the waveguide layer which faces the liquid crystal layer; and
a collimation light source on a lateral surface of the waveguide layer, light emitted by the collimation light source being coupled into the waveguide layer and output from the grating layer;
a pixel electrode and a common electrode, wherein the pixel electrode and the common electrode are between the liquid crystal layer and the first base substrate, both the pixel electrode and the common electrode are configured for being supplied with voltages to regulate a difference between a refractive index of the liquid crystal layer and a refractive index of the grating layer, such that the display device displays in different brightnesses.

2. The display device according to claim 1, wherein the refractive index of the liquid crystal layer is changed between a maximum refractive index and a minimum refractive index under the voltages supplied for the pixel electrode and the common electrode; and a refractive index of the grating layer is greater than or equal to the minimum refractive index of the liquid crystal layer, and smaller than or equal to the maximum refractive index of the liquid crystal layer.

3. The display device according to claim 2, wherein the grating layer comprises: a plurality of grating units arranged in an array, each of the plurality of the grating units comprises a first grating sub-unit, a second grating sub-unit and a third grating sub-unit, the first grating sub-unit is configured for outputting a first primary color light in a direction facing human eyes, the second grating sub-unit is configured for outputting a second primary color light in a direction facing the human eyes, and the third grating sub-unit is configured for outputting a third primary color light in a direction facing the human eyes.

4. The display device according to claim 3, further comprising a plurality of pixel units, each of the plurality of the pixel units comprises a first sub-pixel unit, a second sub-pixel unit, and a third sub-pixel unit,
wherein the pixel unit is in one-to-one correspondence with the grating unit; or, each of the first grating sub-unit, the second grating sub-unit, and the third grating sub-unit in the grating unit is in one-to-one correspondence with one of columns of sub-pixel units in the plurality of the pixel units.

5. The display device according to claim 4, wherein the pixel electrode and the common electrode are both located on a same side of the liquid crystal layer.

6. The display device according to claim 5, wherein one of the pixel electrode and the common electrode comprises a strip-shaped electrode, and the other comprises a plate-shaped electrode, and the strip-shaped electrode and the plate-shaped electrode are arranged in different layers.

7. The display device according to claim 6, wherein the strip-shaped electrode is closer to the liquid crystal layer than the plate-shaped electrode.

8. The display device according to claim 7, wherein one of the pixel electrode and the common electrode comprises a strip-shaped electrode, and the other comprises a plate-shaped electrode, and
wherein the grating layer comprises a plurality of grids, part or all of the grids of the grating layer are connected with each other to form the strip-shaped electrode, the plate-shaped electrode is located between the waveguide grating and the first base substrate.

9. The display device according to claim 5, wherein the pixel electrode comprises a first strip-shaped electrode, the common electrode comprises a second strip-shaped electrode, the first strip-shaped electrode and the second strip-shaped electrode are arranged at intervals in a same layer.

10. The display device according to claim 5, wherein the grating layer comprises a plurality of grids, part of the grids are connected with each other to form the pixel electrode, part of the grids are connected with each other to form the common electrode, the part of the grids for forming the pixel electrode and the part of the grids for forming the common electrode are alternately arranged.

11. The display device according to claim 10, wherein the pixel electrode comprises a first strip-shaped sub-electrode, and the common electrode comprises a second strip-shaped sub-electrode, another part of the grids merely used as gratings are between the first strip-shaped sub-electrode and the second strip-shaped sub-electrode.

12. The display device according to claim 4, wherein liquid crystal molecules in the liquid crystal layer are nematic phase liquid crystal molecules.

13. The display device according to claim 12, wherein the liquid crystal molecules in the liquid crystal layer are the nematic phase liquid crystal molecules, the display device further comprises a polarizer, and the polarizer is on one side of the liquid crystal layer distal to the waveguide layer.

14. The display device according to claim 12, wherein the liquid crystal molecules in the liquid crystal layer are the nematic phase liquid crystal molecules, the display device further comprises alignment layers, and the alignment layers are on at least one of two opposite sides of the liquid crystal layer and is in contact with the liquid crystal layer.

15. A display method applied to the display device according to claim 1, comprising:
scanning pixels in the display device row by row; and
while scanning one row of pixels, applying an electric field to the liquid crystal layer of the scanned pixels according to a gray scale value of each pixel, so that the refractive index of the liquid crystal layer of the pixels is between a minimum refractive index of the liquid crystal layer and a maximum refractive index of the liquid crystal layer.

\* \* \* \* \*